United States Patent
Nemeth et al.

(10) Patent No.: US 9,979,923 B1
(45) Date of Patent: May 22, 2018

(54) IMPACT-RESISTANT MOUNTING DESIGNS

(71) Applicant: Rockwell Collins, Inc., Cedar Rapids, IA (US)

(72) Inventors: Paul R. Nemeth, Springville, IA (US); Joseph L. Tchon, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 713 days.

(21) Appl. No.: 14/447,962

(22) Filed: Jul. 31, 2014

(51) Int. Cl.
| | |
|---|---|
| *G02B 27/10* | (2006.01) |
| *A47B 63/06* | (2006.01) |
| *A47B 67/02* | (2006.01) |
| *H04N 5/655* | (2006.01) |

(52) U.S. Cl.
CPC .................. *H04N 5/655* (2013.01)

(58) Field of Classification Search
CPC ........ G02B 27/0149; G02B 2027/0156; G02B 2027/0167
USPC .......................................... 350/174; 359/632
See application file for complete search history.

(56) References Cited

U.S. PATENT DOCUMENTS

| | | | | |
|---|---|---|---|---|
| 4,749,256 A | * | 6/1988 | Bell .................... | G02B 27/0149 359/632 |
| 5,096,271 A | * | 3/1992 | Portman .......... | B64D 11/00153 244/118.5 |
| 9,487,157 B1 | * | 11/2016 | Vinton ..................... | B60N 2/64 |
| 2004/0148078 A1 | * | 7/2004 | Nakano ................... | B60C 23/00 701/41 |
| 2008/0159556 A1 | * | 7/2008 | Ambrose ................ | B60R 11/02 381/86 |

FOREIGN PATENT DOCUMENTS

| | | | |
|---|---|---|---|
| CA | 2820253 A1 | * | 7/2013 |
| WO | WO 2014081585 A2 | * | 11/2013 |

* cited by examiner

*Primary Examiner* — Andy Rao
*Assistant Examiner* — Zaihan Jiang
(74) *Attorney, Agent, or Firm* — Angel N. Gerdzhikov; Donna P. Suchy; Daniel M. Barbieri

(57) ABSTRACT

A system and method for video display aboard an aircraft, automobile, or other vehicle includes a housing and an assembly including a display screen partially or completely contained within the housing. When the display screen is impacted by an object or a passenger of the vehicle, brackets and support members absorb and dissipate impact energy such that the display screen is prevented from breakage or dislodgement due to absorbed energy. Instead, the display screen may absorb impact energy insufficient to break it but sufficient to direct or shift the display screen from its original position to a new position. The video display system may also include spring-loaded or actuated brackets to return the display screen to its original position after an impact, and sensors to alert a user to inspect, repair or replace the brackets, display screen, or other system components.

20 Claims, 5 Drawing Sheets

IMPACT-RESISTANT MOUNTING DESIGNS

BACKGROUND

Aviation and automotive requirements governing Head Injury Criteria (HIC) state that a video display system including a glass-surfaced display screen must not, when subjected to an impact from the head (or other part) of an occupant of the vehicle during a collision or accident, create sharp shards or dislodge any glass materials that might cause additional injury (e.g., cuts, punctures, or eye damage) to any occupant of the vehicle. Conventional approaches involve increasing the strength of cover glass used for such display systems. However, thick and/or heavy cover glass may not always be a practical solution given the extreme impact forces or momentum involved during vehicular collisions or accidents. It may therefore be desirable to provide a video display screen that meets or exceeds HIC or other impact-resistance requirements without the use of extremely thick cover glass.

SUMMARY OF THE INVENTION

Embodiments of the present invention are directed to an assembly for a video display system mountable in an automobile, aircraft, or other vehicle that can include a support. In embodiments, the assembly can also include a display screen. In embodiments, the assembly can also include a bracket coupled to the display screen and to the support. In embodiments, the bracket can be configured to secure the display screen to the support in a first position. In embodiments, the bracket can also be configured to absorb a portion of impact force applied to the display screen. In embodiments, the bracket can also be configured to direct the display screen to a second position when the portion of impact force absorbed by the bracket reaches a threshold less than an amount of impact force sufficient to break the display screen.

Embodiments of the present invention are also directed to a video display system mountable in an automobile, aircraft, or other vehicle. In embodiments, the video display system can include a housing. In embodiments, the video display system can also include an assembly. In embodiments, the assembly can include a bracket coupled to the housing and to a display screen. In embodiments, the display screen can be at least partially supported in the housing in a first position by the bracket. In embodiments, the bracket can be configured to absorb a portion of impact force. In embodiments, the bracket can also be configured to direct the display screen to a second position when the portion of impact force absorbed by the bracket reaches a threshold less than an amount of impact force sufficient to break the display screen.

Embodiments of the present invention are also directed to a method of impact response for a video display system in a vehicle. In embodiments, the video display system can include a housing. In embodiments, the video display system can also include an assembly. In embodiments, the assembly can also include a display screen at least partially supported in the housing in a first position by a bracket. In embodiments, the display screen can be configured to break upon absorbing a first portion of impact force. In embodiments, the method can include the step of, when an object impacts the display screen, absorbing a second portion of impact force from the object via the bracket. A further step of the method can include, when the second portion of impact force absorbed by the bracket reaches a threshold less than the first portion of impact force sufficient to break the display screen, directing the display screen to a second position via the bracket.

BRIEF DESCRIPTION OF THE FIGURES

The advantages of the invention may be better understood by those skilled in the art by reference to the accompanying figures in which.

DETAILED DESCRIPTION

Features of the present invention in its various embodiments are exemplified by the following descriptions with reference to the accompanying drawings, which describe the present invention with further detail. These drawings depict only selected embodiments of the present invention, and should not be considered to limit its scope in any way.

Figure 1A:
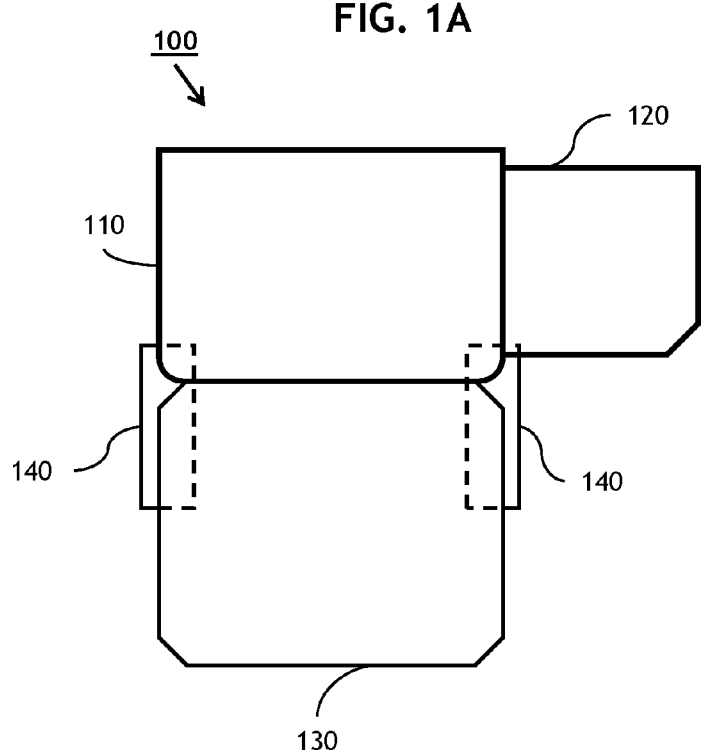
FIGS. 1A and 1B are respectively front view and side view illustrations of a video display system according to embodiments of the present invention.
Figure 1B:
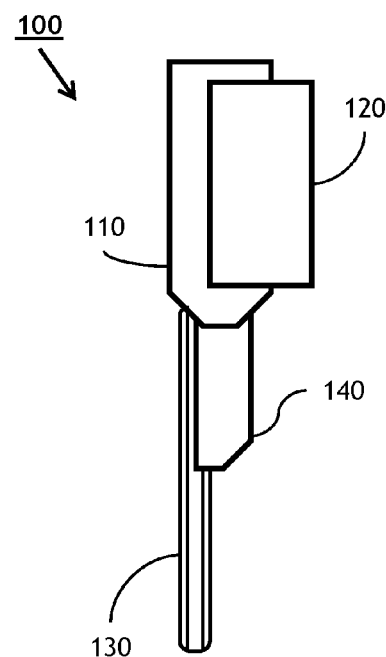

FIGS. 1A and 1B illustrate front and side views respectively of a video display system 100 mountable in an aircraft or other vehicle according to embodiments of the present invention. The video display system 100 can include assembly 110 which may be contained in, or connected to, housing 120 and can incorporate control systems for display screen 130. In some embodiments, housing 120 can be mounted to a bulkhead or otherwise secured for use aboard the aircraft or vehicle. In some embodiments, display screen 130 can be mounted to assembly 110 or housing 120 by energy absorbing support members 140. In some embodiments, display screen 130 can incorporate multiple layers of glass, rugged glass, or glass configured to absorb a known quantity of impact force (ex.—energy) prior to reaching a shatter threshold and breaking or shattering.

Figure 2:
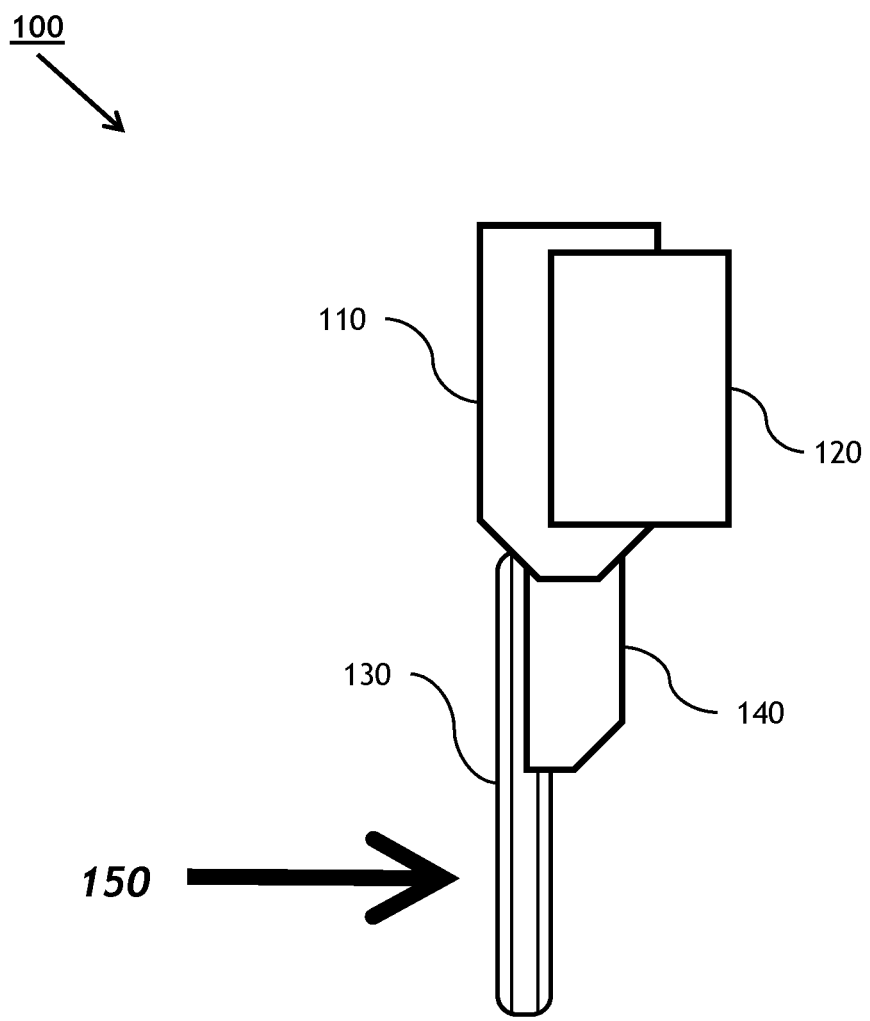
FIG. 2 is a side view illustration of a video display system according to embodiments of the present invention, subjected to an impact force.

FIG. 2 illustrates an impact force 150 being applied to the display screen 130 of video display system 100 according to embodiments of the present invention. In some embodiments, impact force 150 can be provided by a head (or other body part) of an occupant of the vehicle in which video display system 100 is mounted. In some embodiments, energy absorbing support members 140 can be designed to break away or deform after absorbing a quantity of impact force 150 (ex.—breakaway threshold) less than the impact force required to shatter or otherwise break display screen 130 (ex.—shatter threshold). In some embodiments a desired safety margin may be achieved by configuring support members 140 such that the breakaway threshold of the support members 140 is lower by a predetermined amount than the shatter threshold of display screen 130, e.g., the breakaway threshold may be 75 percent, 85 percent, 90 percent or any desired percentage of the shatter threshold.

Figure 3A:
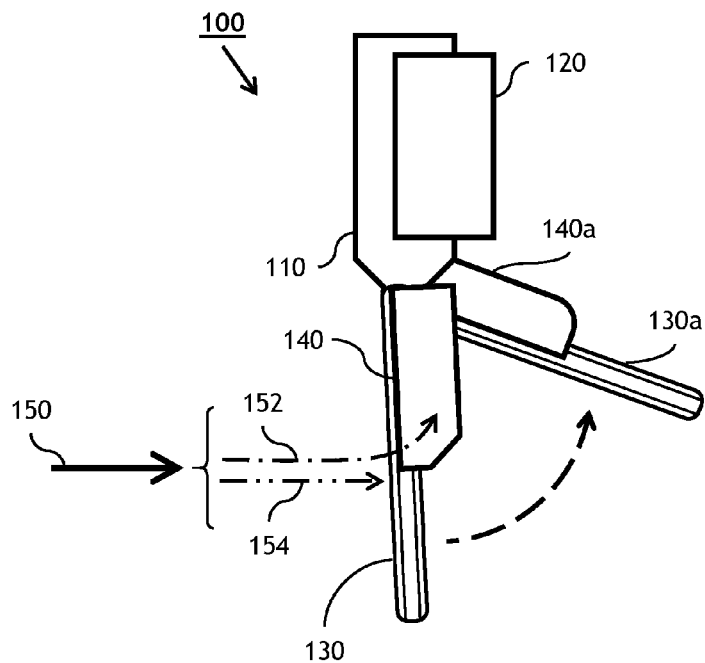
FIG. 3A is a side view illustration of a video display system absorbing an impact force according to embodiments of the present invention.

FIG. 3A illustrates display screen 130 of video display system 100 shifted to a new position (130*a*) by energy absorbing support members 140 after absorbing impact force 150 according to embodiments of the present invention. In some embodiments, energy absorbing support members 140 can react to an impact force 150 greater than the shatter threshold of display screen 130 by absorbing a first portion 152 of the impact force, the remaining impact force 154 being less than the shatter threshold. In some embodiments, energy absorbing support members 140 can then disperse the remaining impact force 154 by breaking away or deforming (140*a*), such that the amount of impact force applied directly to display screen 130 at no point exceeds the shatter threshold or any other desired predetermined amount of force. In some embodiments, dispersing the remaining impact force 154 may shift display screen 130 to a new position (130*a*) while preventing display screen 130 from completely detaching or dislodging from assembly 110. In some embodiments, an impact force 150 less than the shatter threshold of display screen 130 may be completely absorbed by support members 140 and dispersed by the deforming or breaking away of support members 140 while preventing display screen 130 from shifting from its initial position.

Figure 3B:
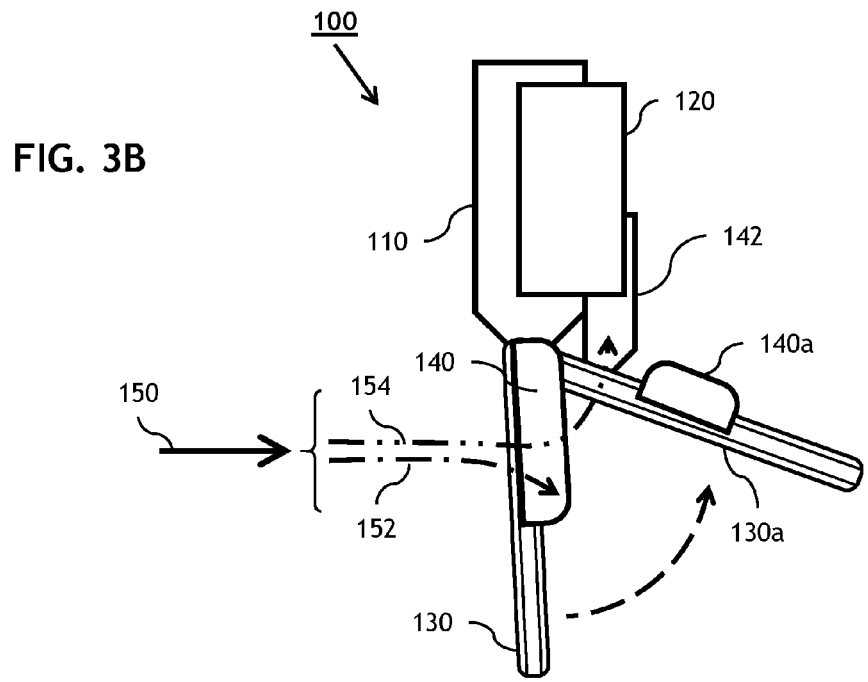
FIG. 3B is a side view illustration of a video display system absorbing an impact force according to embodiments of the present invention.

In some embodiments, illustrated in FIG. 3B, energy absorbing support members 140 can include secondary energy absorbing support members 142. In some embodiments, after absorbing a quantity of impact force 150 less than the shatter threshold of display screen 130, primary energy absorbing support members 140 may completely absorb impact force 150 by partially breaking away, deforming, or detaching from assembly 110 without dislodging display screen 130. In some embodiments, primary energy absorbing support members 140 may react to an impact force 150 greater than the shatter threshold by absorbing a first portion of impact force 152, such that the remaining impact force 154 is less than the shatter threshold. Primary energy absorbing support members 140 may then completely deform or detach (140*a*) from assembly 110. In some embodiments, secondary energy absorbing support members 142 may then absorb or disperse the remaining impact force 154, shifting display screen 130 to a new position (130*a*) while preventing display screen 130 from completely detaching or dislodging from assembly 110. In some embodiments, energy absorbing support members 140 and 142 can be spring-loaded or otherwise actuated. In some embodiments, energy absorbing support members 140 and 142 can be partially or fully elastic, compressible, pliable, collapsible, or flexible. In some embodiments, energy absorbing support members 140 and 142 can include one or more deformable portions configured to break away, detach, flex, stretch, bend, compress, collapse, reposition, or shift position when impact force 150 is applied to display screen 130. In some embodiments, spring-loaded or actuated brackets 140 can further be configured for resetting, returning housing 120 and display screen 130 to their initial position after activation or when impact force 150 is no longer applied to the display screen 130.

Figure 4:
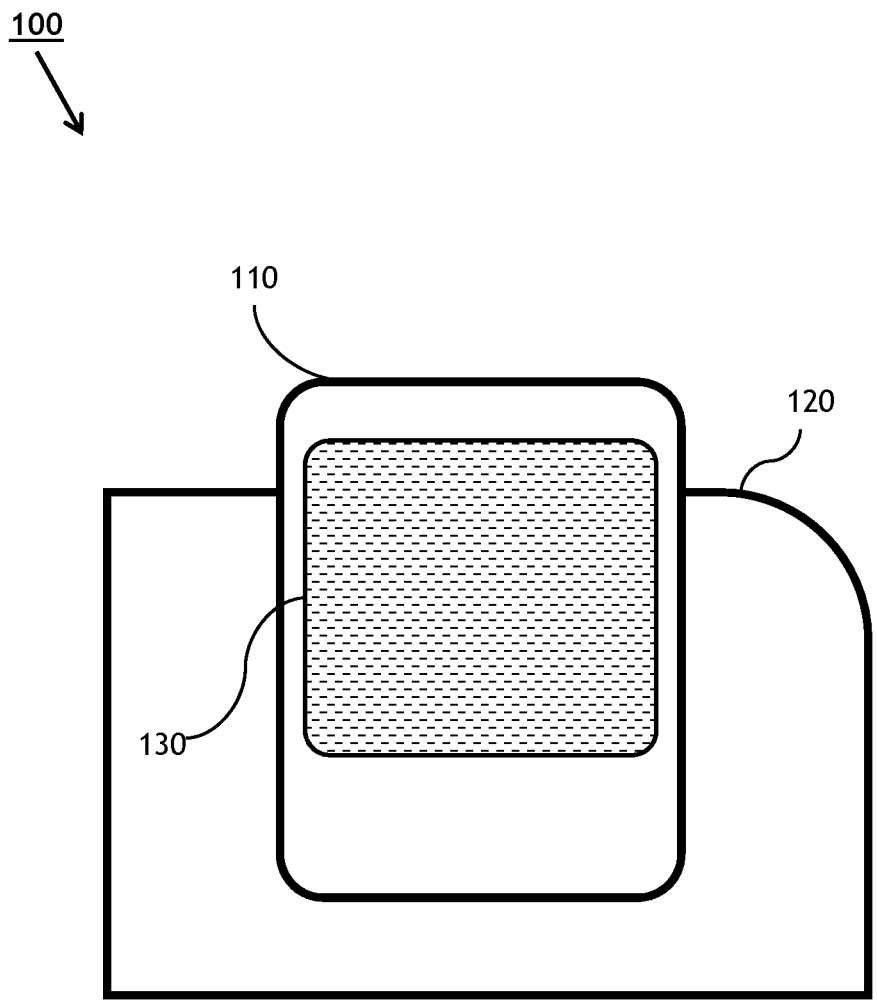
FIG. 4 is a front view illustration of a video display system according to embodiments of the present invention.
Figure 5A:
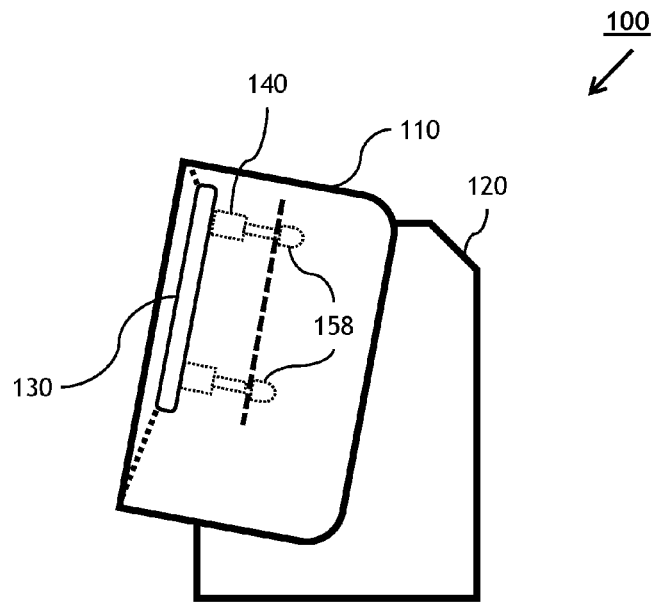
FIG. 5A is a side view illustration of a video display system according to embodiments of the present invention.
Figure 5B:
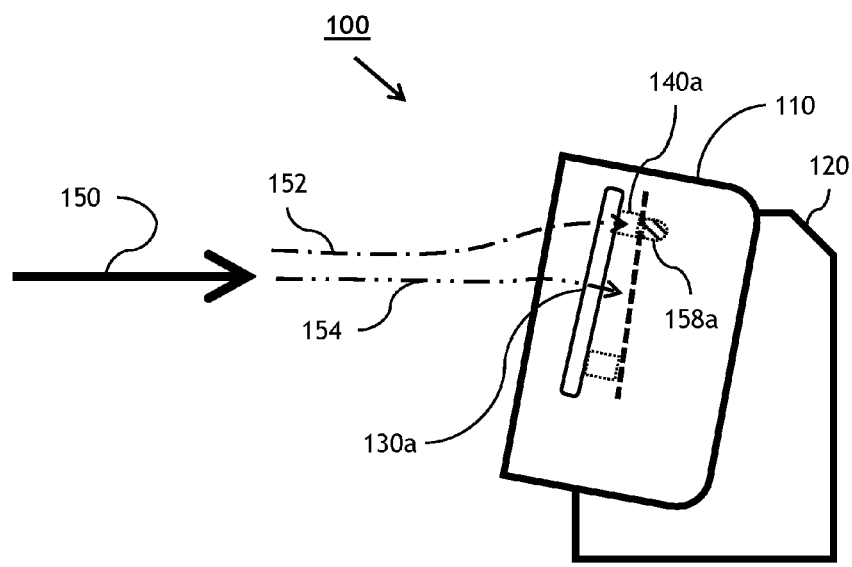
FIG. 5B is a side view illustration of a video display system absorbing impact force according to embodiments of the present invention.

FIG. 4 illustrates a front view, and FIG. 5A illustrates a side view, of a video display system 100 including housing 120 and assembly 110, including display screen 130, according to embodiments of the present invention. In some embodiments, display screen 130 can be partially or fully contained within assembly 110, or display screen 130 and assembly 110 can be partially or fully enclosed by housing 120, which can itself be mountable to the dashboard of an automobile. In some embodiments display screen 130 can be mounted within assembly 110 by energy absorbing support members 140. Referring to FIGS. 5A and 5B, in some embodiments, when subjected to impact force 150, energy absorbing support members 140 can absorb a portion of impact force 152 such that the remainder 154 of impact force 150 is less than the shatter threshold of display screen 130. In some embodiments, support members 140 can be configured to absorb a predetermined amount 152 of impact force (ex.—breakaway threshold) less than the shatter threshold of display screen 130, e.g., 75 percent, 85 percent, or any desired percentage of the shatter threshold. In some embodiments, one or more support members 140 can deform, compress, or collapse upon reaching the breakaway threshold 152 (140*a*), the remainder 154 of impact force 150 being dispersed or dissipated by directing display screen 130 to move in the general direction of the impact force, shifting display screen 130 into a second position (130*a*). In embodiments, the motion of display screen 130 while dissipating the remainder 154 of impact force 150 may include movement in the general direction of impact force 150 as well as rotation, twisting, turning, angular movement, or tilting along a predetermined compression axis of one or more support members 140. In some embodiments, energy absorbing brackets 140 can be spring-loaded or otherwise actuated and, upon absorption of a predetermined amount of impact force or reaching a breakaway threshold 152, can be configured to subsequently reset (along with display screen 130) to their original pre-impact position. In some embodiments, the interior of assembly 110 or housing 120 may be configured with grooves, channels, recesses, or other means of directing display screen 130 along a predetermined path to a second position inside the assembly or housing once display screen 130 has been dislodged by absorbed impact force.

Referring to FIGS. 5A and 5B, in some embodiments support members 140 may include a sensor 158 configured to alert (158*a*) a user to a condition requiring the attention of the user. In some embodiments, a condition may include routine inspection or damage due to energy absorption that requires inspection, repair, or replacement of the support member, display screen, or any other component of the assembly. In some embodiments, an alert 158*a* may include a textual message displayed on display screen 130, a visual or auditory alert, or haptic feedback.

Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected", or "coupled", to each other to achieve the desired functionality, and any two components capable of being so associated can also be viewed as being "couplable", to each other to achieve the desired functionality. Specific examples of couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

We claim:

1. An assembly for a video display system, comprising:
   at least one housing mountable to a vehicle;
   a first energy-absorbing support member; and
   at least one display screen coupled to the housing by the first energy-absorbing support member, the at least one display including a front side, a back side, and a side edge;
   wherein the first energy-absorbing support member is configured to:
   (a) secure the at least one display screen to the at least one housing in a first position relative to the at least one housing;
   (b) absorb a first quantity of impact force applied to the front side of the at least one display screen; and
   (c) allow the at least one display screen to move to a second position relative to the at least one housing when the first quantity of impact force reaches a threshold less than a shatter threshold of the at least one display screen;
   wherein the first energy-absorbing support member includes a first portion and a second portion, the first portion and the second portion positioned along the side edge of the at least one display screen, the first portion including an axis passing through the first portion of the first energy-absorbing support member such that the at least one display screen is rotatable about the axis, the first portion detachable from the second portion when the first quantity of the impact force reaches the threshold such that the second portion of the first energy-absorbing support member moves with the at least one display screen to the second position.

2. The assembly of claim 1, wherein the first energy-absorbing support member is configured to return the at least one display screen from the second position to the first position via at least one of a spring and an actuator.

3. The assembly of claim 1, further comprising:
   a second energy absorbing support member positioned behind and partially above the at least one display screen and the first energy absorbing member when the at least one display screen is in the first position, the second energy-absorbing support member positioned such that the second energy absorbing member is configured to absorb a second quantity of the impact force when the at least one display screen moves to the second position.

4. The assembly of claim 1, wherein the video display system is mounted in at least one of an automobile and an aircraft.

5. The assembly of claim 1, wherein the at least one display screen is fully enclosed within the housing.

6. The assembly of claim 5, wherein the first energy-absorbing support member allows the at least one display screen to recess into the housing.

7. The assembly of claim 1, further comprising:
   at least one sensor coupled to at least one of the first energy-absorbing support member and the at least one display screen and configured to generate at least one of a visual alert, an auditory alert, and a haptic alert configured to alert a user of at least one of a required inspection of, damage to, required repair of, and required replacement of at least one of the first energy-absorbing support member and the at least one display screen.

8. A video display system for a vehicle, comprising:
   at least one housing mountable to a vehicle; and
   at least one assembly comprising:
   control systems of the video display system;
   a first energy-absorbing support member;
   at least one display screen supported at least partially in the housing in a first position by the first energy absorbing support member, the at least one display including a front side, a back side, and a side edge;
   wherein the first energy absorbing support member is configured to:
   (a) absorb a first quantity of impact force applied to the front side of the at least one display screen; and
   (b) allow the at least one display screen to move to a second position relative to the housing when the first quantity of impact force reaches a threshold less than a shatter threshold associated with the display screen;
   wherein the first energy-absorbing support member includes a first portion and a second portion, the first portion and the second portion positioned along the side edge of the at least one display screen, the first portion including an axis passing through the first portion of the first energy-absorbing support member such that the at least one display screen is rotatable about the axis, the first portion detachable from the second portion when the first quantity of the impact force reaches the threshold such that the second portion of the first energy-absorbing support member moves with the at least one display screen to the second position.

9. The display system of claim 8, wherein the first energy absorbing support member is configured to return the at least one display screen from the second position to the first position via at least one of a spring and an actuator.

10. The display system of claim 8, wherein the at least one assembly further comprises:
a second energy absorbing support member positioned behind and partially above the at least one display screen and the first energy absorbing member when the at least one display screen is in the first position, the second energy-absorbing support member positioned such that the second energy absorbing member is configured to absorb a second quantity of the impact force when the at least one display screen moves to the second position.

11. The display system of claim 8, wherein the vehicle is at least one of an automobile and an aircraft.

12. The display system of claim 8, wherein the at least one display screen is fully enclosed within the at least one housing.

13. The display system of claim 12, wherein the first energy absorbing support member directs the at least one display screen to recess into the at least one housing.

14. The display system of claim 8, further comprising:
at least one sensor coupled to at least one of the first energy absorbing support member and the at least one display screen and configured to generate at least one of a visual alert, an auditory alert, and a haptic alert configured to alert a user of at least one of a required inspection of, damage to, required repair of, and required replacement of at least one of the first energy-absorbing support member and the at least one display screen.

15. A method of impact response for a video display system in a vehicle, the video display system including at least one housing mounted to the vehicle, the method comprising:
when at least one object impacts a front side of at least one display screen coupled to the housing in a first position relative to the housing by a first energy absorbing support member, absorbing a first quantity of impact force from the at least one object via the first energy absorbing support member; and
when the first quantity of impact force reaches a threshold less than the shatter threshold, allowing the at least one display screen to move to a second position relative to the housing via the first energy absorbing support member,
wherein the first energy-absorbing support member includes a first portion and a second portion, the first portion and the second portion positioned along a side edge of the at least one display screen, the first portion including an axis passing through the first portion of the first energy-absorbing support member such that the at least one display screen is rotatable about the axis, the first portion detachable from the second portion when the first quantity of the impact force reaches the threshold such that the second portion of the first energy-absorbing support member moves with the at least one display screen to the second position.

16. The method of claim 15,
wherein a second energy absorbing support member is positioned behind and partially above the at least one display screen and the first energy absorbing member when the at least one display screen is in the first position, the second energy-absorbing support member positioned such that the second energy absorbing member is configured to absorb a second quantity of the impact force when the at least one display screen moves to the second position.

17. The method of claim 15, wherein the allowing the at least one display screen to move to a second position via the first energy absorbing support member includes:
allowing the at least one display screen to recess into the housing.

18. The method of claim 15, further comprising:
returning the at least one display screen from the second position to the first position via the first energy absorbing support member.

19. The method of claim 15, wherein the vehicle is at least one of an automobile and an aircraft.

20. The method of claim 15, further comprising: generating at least one of a visual alert, an auditory alert, and a haptic alert configured to alert a user of at least one of a required inspection of, damage to, required repair of, and required replacement of at least one of the first energy-absorbing support member and the at least one display screen.

* * * * *